INVENTOR
ROBERT L. IRVINE
BY Adams Forward McLean
ATTORNEYS

United States Patent Office 3,088,987
Patented May 7, 1963

3,088,987
ALKYLATION OF ISOPARAFFINS WITH OLEFINS COOLED BY AUTOREFRIGERATION
Robert L. Irvine, New York, N.Y., assignor to Arabian American Oil Company, New York, N.Y., a corporation of Delaware
Filed Nov. 19, 1957, Ser. No. 697,454
9 Claims. (Cl. 260—683.61)

The present invention relates to the production of high anti-knock hydrocarbons boiling within the gasoline range by the alkylation of isoparaffins with olefins while in the presence of a catalyst and more particularly to a method whereby the alkylation reaction is cooled by auto-refrigeration and wherein the quantity of lower boiling constituens such as propane acting as a diluent in the reaction system are maintained at a minimum.

Alkylation reactions are usually carried out in a continuous manner by bringing the liquid isoparaffin, liquid olefin and liquid catalyst together in a reaction zone at temperatures of about 35 to 100° F. under such conditions that an intimate mixing of the reactants and the catalyst is obtained and an emulsion is formed. In order to promote the alkylation reaction, it is preferred that the isoparaffin reactant be maintained in the reaction zone in amounts substantially in excess of the olefins, for example ratios of 20:1 to 50:1 or higher are advantageous. Since the reaction is an exothermic one means must generally be employed to keep the reaction temperature at the above-indicated temperatures. Recently, this has been achieved by various evaporative cooling procedures known as auto-refrigeration wherein a portion of the reaction mixture is evaporated from the reaction zone in order to provide cooling thereof. For the sake of economy, these coolant or refrigerant vapors are usually compressed and condensed so as to remove their heat of vaporization and then recycled back to the alkylation reaction zone. Furthermore, in such a system the amount of lower boiling normal paraffins present in the system must be kept to a minimum since they are inert to the reaction and act merely as a diluent thus decreasing the effective isoparaffin to olefin ratio and hence the efficiency of the system. These lower boiling constituents are unavoidably introduced into the alkylation reaction along with the hydrocarbon fraction containing isoparaffin and/or the olefin and since they too will be evaporated in the reaction zone as one of the refrigerant vapors it is desirable to remove these lower boiling paraffins from the refrigerant stream before the isoparaffin is returned to the alkylation zone.

In accordance with the present invention I have provided a sulfuric acid catalyzed alkylation reaction system operable in a manner so as to give a high ratio of isoparaffin to olefin in each of a succession of reaction zones and the reaction zones are effectively cooled by evaporation of a part of the reaction mixture. The present invention also comprises a method wherein the propane vapors removed from the reaction zone in the refrigerant stream can be separated therefrom before the isoparaffin is recycled back to the alkylation zone without the use of low temperature-high pressure fractionation equipment normally in use for this purpose.

In practicing the present invention, I provide a vertical alkylation tower which is divided into two compartments or sections by means of a horizontal plate. The dividing plate can advantageously have vapor risers therethrough for the admission of the refrigerant vapors from the alkylation unit as hereinafter described. The upper section of the tower is an entrainment removal unit and can be subdivided into an upper and lower section by a horizontal plate having a liquid valve disposed at any convenient location thereon. The upper section of the entrainment removal unit is designed as a flash chamber so that the liquid isoparaffin feed entering the system can be flashed to provide a cooling effect thereupon. A line is provided at the top of the flash section to remove the isoparaffin vapor thus flashed and this line is advantageously in communication with the bottom of the alkylation unit or lower section of the tower as hereinafter described. The lower section of the entrainment removal unit can contain a series of horizontal liquid-vapor contact plates such as conventional bubble plates or perforated plates. The cooled liquid isoparaffin drawn off from the top section of the entrainment removal unit flows downward over the contact plates in the lower section washing the upcoming refrigerant vapors as they enter the entrainment removal unit through the risers. If necessary or desirable these refrigerant vapors can pass through a conventional demister before leaving the contacting section of the entrainment removal unit by means of a drawoff line. In order to regulate the pressure in the tower I can provide a valve in this drawoff pipe or I can vary the speed of a refrigerant compressor so that more or less of the refrigerant vapors are removed, thereby affording a means to control the temperature in the alkylation reactor. It is preferred that the speed of the refrigerant compressor be varied in order to minimize the power requirements for my unit. The liquid isoparaffin collecting on the bottom horizontal plate of the entrainment removal unit is removed by means of a pump and sent to a mixer or homogenizer in order to emulsify it with the sulfuric acid catalyst. The isoparaffin acid emulsion from the mixer is then passed to the top part of the lower alkylation reaction unit of the tower. In this unit, I also provide a series of vertically disposed horizontally positioned liquid-vapor contact trays. Any number of these trays can be provided and they can be of the conventional bubble or perforated plate type having downcomers on alternate sides to provide for liquid flow to the next succeeding lower tray. The olefin charge is introduced into this alkylation unit at a multiplicity of points, preferably at each of the contact trays. It is also preferred that the liquid olefin charge be distributed by means of jets, across the inlet of each tray. To accomplish this, I have provided headers connected to the olefin inlet lines. The headers are preferably disposed transversely across the downcomer of each tray and will have a series of nozzles directed to the tray inlet to provide the jet spray. As the isoparaffin-acid emulsion passes downwardly over each successive tray, the olefin charge introduced thereon provides in effect a plurality of reaction zones within the tower. As mentioned previously, I have provided a line communicating with the top of the flash section of the entrainment removal unit and the bottom of the alkylation unit. By this provision I maintain a high isoparaffin to olefin ratio on the lowermost reaction trays besides gaining the additional turbulence as the isoparaffin vapors progress upward through the reaction zones. The alkylate product emulsified in the sulfuric acid catalyst is removed from the bottom of the reaction unit and is conducted to an electrostatic emulsion breaking means wherein the acid is separated from the alkylate product.

The hydrocarbon alkylate effluent recovered from this electrostatic separation means is passed to a centrifugal contactor wherein it is countercurrently contacted with fresh incoming sulfuric acid. This contact with the fresh acid removes the esters from the hydrocarbon effluent and returns them to the reaction system until disposed of in the spent acid stream. The acid separated in the emulsion breaking means can be recycled in part to the isoparaffin-acid mixer or withdrawn from the system and disposed of as desired after passing through heat exchangers provided to cool the incoming fresh sulfuric acid. The alkylate product is passed to a fractionation section for separation of the hydrocarbons. The isobutane product from this fractionation section is recirculated to the reactor. Before the alkylate product passes from the system, however, I find it desirable to cool the incoming isoparaffin and olefin reactants with the alkylate product by passing the product through a series of heat exchangers arranged in heat exchange relationship with the incoming reactants.

In the alkylation system described the surfuric acid catalyst should have a concentration of about 86 to 100 weight percent and preferably about 90 to 96 weight percent. If the acid concentration falls below these limits the catalyst can be discarded as spent acid. The ratio of acid to hydrocarbon is desirably maintained within the range of about 1 to 2 liquid volumes of acid per liquid volume of hydrocarbon and preferably at about 1.4 volumes. In order to provide a high quality alkylate in the present system the temperature should be maintained at about 35 to 70° F. and preferably about 35 to 50° F. and at a pressure sufficient to maintain a predominant amount of the reactants in the liquid phase at the operating temperatures, generally about 0 to 40 p.s.i.g. sufficing. The pressure requirement is dictated by the bubble point of the liquid and I can adjust the pressure by varying the speed of the refrigerant stream compressor which will change the degree of evaporative cooling of the reaction mixture so that the reaction temperature can be maintained at a given point. The reactant flow through the alkylation unit can be adjusted so that sufficient contact time with the sulfuric acid is afforded to offer substantial alkylation of the isoparaffin by the olefin. It is preferred that this contact time be held at a minimum since long residence or contact time tends to lead to degradation of the light alkylates and hence poorer octane numbers.

The temperature of the alkylation reaction is controlled as previously mentioned by regulating the pressure in the alkylation unit by varying the speed of the refrigerant stream compressor or by a valve positioned in the refrigerant vapor drawoff line leading from the contacting section of the entrainment removal unit. Since these refrigerant vapors are composed largely of the isoparaffin reactant it is advantageous, for economical reasons, to recycle them to the alkylation tower after ridding them of the lower boiling normal hydrocarbons, such as propane, which act as a diluent in the system, and the heat of vaporization contained therein.

In order to effect the separation of the isoparaffin from the propane or other lower boiling hydrocarbon diluents, I compress the refrigerant vapors to a pressure sufficient so that at least a part of the isoparaffin contained therein will be condensable at the temperature of the cooling medium available. The compressed vapors are partially condensed in a heat exchanger through which flows a cooling medium such as water. Although other cooling mediums can be used, I prefer the use of water because of its ready availability. The compressed partially condensed vapors are passed to a fractionation tower. This tower is divided into three main portions by horizontal plates having liquid control valves disposed therein. The middle portion is the enriching fractionation section and comprises a series of vertically disposed horizontally positioned liquid-vapor contact plates and they can be similar to those used in the alkylation reaction zone. Pressure is maintained on this middle portion advantageously at a point below that produced by the refrigerant vapors compressor. The vapor flow into this zone can be regulated by any known means. Preferably, however, I regulate the vapor flow by means of a pressure differential instrument across the enriching section and connected to a valve on the partial condenser so that a change in pressure as a result of a change in vapor flow in the section will result in increasing or decreasing the flow of coolant through the condenser thus resulting in a decrease or increase in the vapor flow and the pressure in the enriching section. The upper section of the tower acts as a storage tank for the cold reflux stream of the lower boiling fraction, e.g. propane, of the refrigerant stream obtained as hereinafter explained. This section can be provided in any number of different ways but I have found it advantageous to sub-divide this upper section into a number of different vertically disposed compartments, each separated by means of a plate having a liquid valve communicating with the next lower section, with the lowermost compartment provided with a valve or similar means to allow the cold reflux stream to flow into the enriching fractionation section. In the upper storage tank section, I can provide lines leading from the top of each of the respective compartments so that any of the reflux stream which evaporates can be removed as overhead. I can also provide conventional demisters in each of the vapor removal lines to remove any liquid which may be entrained therein. In order to provide a cold reflux stream of the lower boiling component of the refrigerant vapors for effecting the fractionation thereof I withdraw the lower boiling components as a vapor from the upper portion of the enriching fractionation section and send them to a compressor wherein they are compressed to a pressure sufficiently high so that they can be condensed with the cooling medium available, e.g. water. The evaporated reflux stream removed as overhead from the reflux storage section can also be directed to the compressor. The compressed condensed vapors are introduced into the lower portion of the fractionation tower from whence they can be withdrawn as needed either as reflux to the enriching section or as drawoff product. The upper or storage section is provided primarily for the purpose of saving power requirements in the vapor compressor since it provides for the evaporation and further cooling of the compressed condensed vapors at an intermediate heat pressure level. However, in some cases it may not be necessary to provide this upper section at all and the cool liquid reflux stream can be introduced directly to the top tray of the enriching fractionation section.

By the introduction of the compressed partially condensed refrigerant vapors into the enriching fractionation section, I make use of the heat energy available in this compressed stream for reboiling energy thus eliminating the usual reboiling equipment in such apparatus. As the refrigerant vapors pass upward in the enriching section they are washed with the cold reflux stream of the lower boiling fraction obtained as aforedescribed. As the vapors move upward through the enriching section they become progressively richer and more concentrated in the lower boiling constituent, and less concentrated in the isoparaffin, the isoparaffin being washed back to the bottom of the enriching section from whence I provide lines and valves to remove and recirculate it back to the flash chamber of the entrainment removal unit of the alkylation tower.

In order to control the pressure in the tower I can utilize a pressure controller to regulate the speed of the vapor compressor. This pressure controller can be set at an operating pressure consistent with the temperature of the cooling medium and may be changed seasonally.

The process of the present invention and the apparatus pertaining thereto can more fully be described by reference to the following figures wherein.

Figure 1:
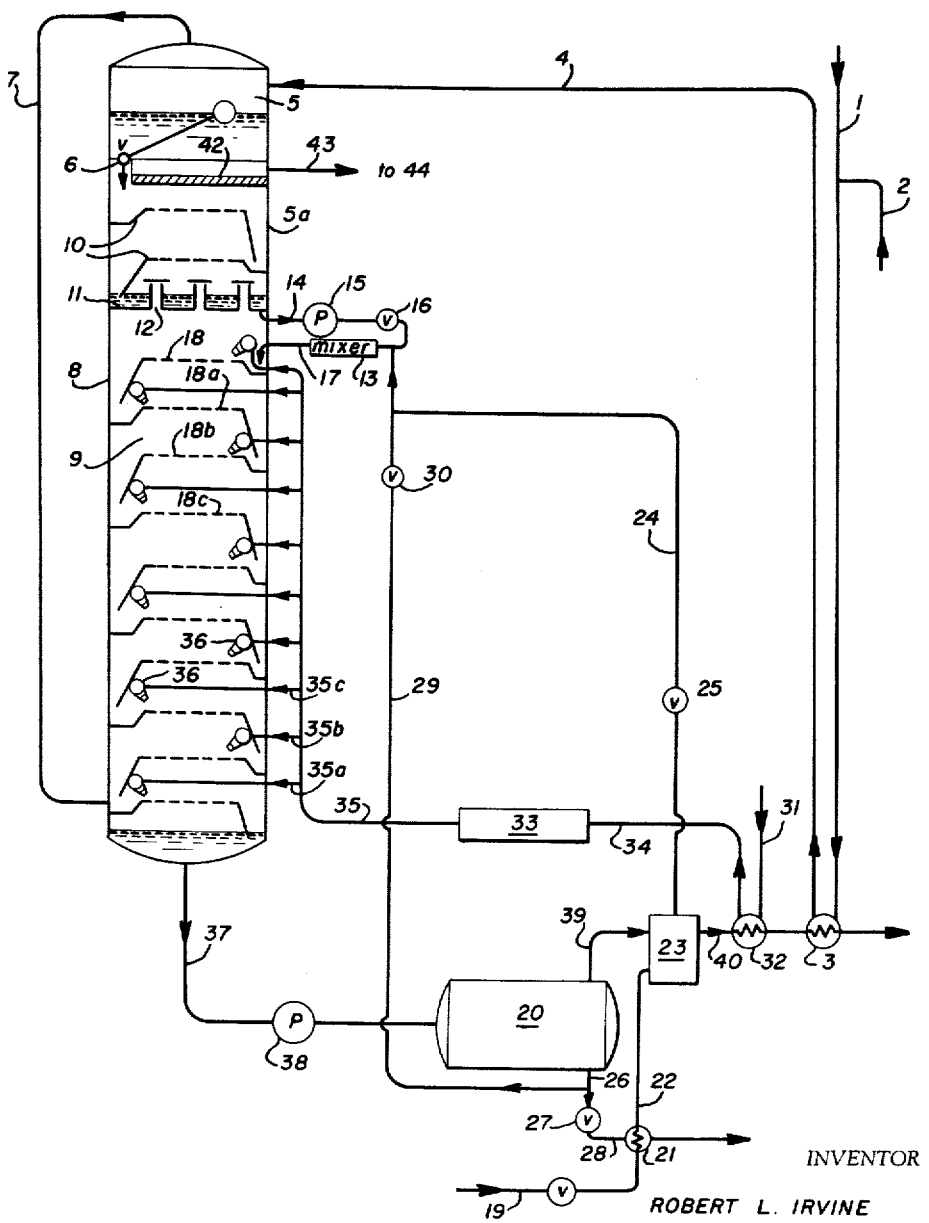
FIGURE 1 shows a cross-sectional view of the alkylation reactor and the reactant flow plan therethrough.

As shown in FIGURE 1 a paraffinic feedstock such as isobutane enters the system by way of line 1. This feedstock can be obtained as recycle from the propane removal unit as hereinafter explained in more detail or can be introduced into the system from other sources as by line 2.

In order to cool the incoming isobutane feedstock I have provided heat exchanger 3. The incoming feedstock is cooled by passing in heat exchange relationship with the outgoing alkylate product from the reaction zone in the exchanger 3. The thus cooled isobutane leaves heat exchanger 3 and passes by means of line 4 to the uppermost section 5 of the entrainment removal unit 6 of alkylation tower 8 wherein the liquid isobutane feed is flashed to provide additional cooling. The flashed isobutane vapors are drawn off as overhead through line 7 and introduced at the bottom of the reaction unit 9 as will be more fully explained hereinafter. The cooled liquid isobutane flows downwardly, controlled by valve (V), to the lower liquid-vapor contact section 5a of entrainment removal unit 6. Section 5a of unit 6 acts as an entrainment removal section wherein the refrigerant vapors liberated from the lower alkylation reaction unit 9 are washed by the liquid isobutane flowing downward over bubble or perforated plates 10. The passage of the refrigerant vapors through the isobutane serves as a reflux to wash back any acid or alkyate hydrocarbons carried overhead with the refrigerant vapors. The liquid isobutane collects in the bottom tray 11 of the entrainment removal section, tray 11 being provided with vapor risers 12 extending above the liquid level thereon.

Since the isoparaffin reactant, e.g. isobutane, constitutes the most difficult emulsification and mixing problem with respect to the sulfuric acid catalyst I have provided a mixer 13 for effecting this emulsification. This mixer can be provided at any convenient location. However, as shown in the diagram, I prefer that it be located externally of the reaction tower 8. The liquid isobutane is withdrawn from tray 11 by means of line 14 and pump 15 and directed to homogenizer or mixer 13. Mixer 13 may be of any conventional type or it can be of the ultrasonic type. If the mixer is of the ultrasonic type, pump 15 may be eliminated as the head itself may be sufficient to provide the flow of isobutane. A valve 16 can be provided in line 14 to regulate the amount of isobutane withdrawn if desired. The isobutane-acid emulsion from mixer 13 is introduced by means of line 17 into the contactor or alkylation reaction unit 9 of the reaction tower 8 preferably at its uppermost plate 18. The isobutane-acid emulsion introduced at the top plate 18 flows downward over each of a succession of vertically disposed plates 18a, 18b, 18c, etc. These contactors or plates are preferably of the perforated type but they can be of other conventional types if desired. The sulfuric acid catalyst for introduction into the mixer or homogenizer 13 can be both fresh acid continuously introduced into the system and recycle acid. The fresh acid enters the system through line 19 and is cooled by passing in heat exchange relationship with the outgoing spent acid from the electrostatic emulsion breaking means 20 in a heat exchanger 21. The cooled fresh acid passes by means of line 22 to a scrubber and centrifugal extractor 23. In extractor 23 the concentrated cooled acid passes in countercurrent contact with the outgoing alkylate product from the reaction zone. The fresh acid is conducted from the extractor 23 by means of line 24 to the isobutane-acid mixer 13 described above. A valve 25 can be placed in line 24 to regulate the flow of fresh acid to the mixer. The recycle acid is obtained as a bottoms product from the electrostatic separation means 20 and can be drawn off by means of line 26. If desired, this acid stream can be split in two portions, one portion being removed from the system by means of valve 27 and line 28 and through the heat exchanger 21 wherein it serves to cool the previously mentioned incoming fresh acid. The remainder of the acid from the electrostatic separating means 20 can be returned to the acid mixer 13 by means of line 29 and valve 30. The olefin feed charge such as a $C_4$ refinery stream containing predominantly butenes can be introduced into the alkylation system by means of line 31. The olefin feed is also advantageously cooled by passing through heat exchanger 32 through which flows the relatively cool outgoing alkylate products. Since the olefin charge may contain water dissolved therein I have provided means to remove this water at a point wherein the olefin is at its lowest temperature, e.g. after passing through heat exchanger 32. Thus, water coalescer 33 is provided in line 34. The dehydrated cooled olefin charge is introduced into the reaction unit 9 of the tower 8 to each of the contactors or trays by means of line 35 and branch lines 35a, 35b, 35c, etc. In oredr to assure intimate commingling of the isobutane-acid emulsion flowing downwardly over the contactor plates 18 in the reaction unit 9 and the olefin reactant I provide a series of headers 36 connected to each of the branch lines 35a, 35b, 35c, etc. Advantageously, the headers 36 are located at the inlet of each tray 18, and will be provided with a series of jet nozzles so that the olefin charge is distributed across the inlet of each tray. The olefin introduced in this manner provides continuous agitation and intimate contact of the reaction mixture. The alkylate product is removed from the bottom of the alkylation reaction unit 9 by means of line 37 and pump 38. Since the alkylate product as withdrawn from unit 9 is emulsified in the sulfuric acid, means must be provided to effect the separation thereof. Generally, a gravity separator is provided at this point. However, a gravity separation of the emulsion usually results in an acid phase containing substantial amounts of the desired alkylate which, if recirculated back through the system with the acid, will have deleterious effects upon the alkylation reaction. To overcome this difficulty, i.e. to reduce the amount of alkylate product sent back to the alkylation unit, I have provided an electrostatic separation means 20 in the drawoff line 37. This electrostatic separator can advantageously be comprised of voltage grid plates on which a differential potential exists that results in the lighter hydrocarbon phase going to the top and the heavier acid phase going to the bottom. The alkylate product is withdrawn from the top of separation means or vessel 20 by way of line 39. The alkylate product is then passed to scrubber and centrifugal extractor 23 wherein any dissolved esters are removed by the countercurrent contact with the incoming fresh sulfuric acid as previously explained. Since the acid is substantially immiscible in the hydrocarbon phase the centrifugal force of the extractor insures complete removal of the acid. Extractor 23 eliminates the conventional treating step of caustic and water washing or bauxite treatment, and also provides a substantially water-free hydrocarbon product since the product is in contact with the acid at its point of highest concentration. The alkylate product passes from the extractor 23 by means of line 40 to the heat exchangers 32 and 3. From exchanger 3 the reaction product is introduced to a conventional fractionation section consisting of a plurality of towers wherein the isobutane contained therein is recovered and recycled and a normal butane product is produced. The alkylates can then be separated into the desired boiling ranges by conventional procedures.

The exothermic heat of reaction is removed in the present process by auto-refrigeration. That is, a pressure is maintained on the system sufficient to effect the vaporization, at the reaction temperatures, of a part of the reactants as they pass through each of the vertically disposed contactors or trays 18. To provide for the pressure control in the reaction unit 9 and ultimately the temperature therein, I vary the speed of the refrigerant compressor 44 (see FIGURE 2) taking suction from refrigerant drawoff line 43 and by speeding up or slowing down this compressor I increase or decrease the reaction temperature.

The advantage of the vertically disposed reaction trays in the present system is that as the refrigerant vapors composed predominantly of isobutane pass upwardly through each successive tray the isobutane ratio on the upper trays will be maintained at a high level and the vapors passing through the reaction mixture will assist in maintaining it in a state of turbulence, thereby assuring more intimate contact of the reactants, all of which are conducive to a high quality alkylate. Also, as mentioned perviously, the flashed isobutane vapors from the flash chamber 5 of the entrainment removal unit 6 are introduced into the reaction unit 9 at the lowermost tray. The introduction of the flashed vaporous isobutane at the bottom tray also provides additional agitation of the reactants and increases the isobutane to olefin ratios on each successive tray or reaction zone.

The vapors removed from the reaction unit 9, consisting essentially of isobutane and lower boiling constituents, e.g. propane, pass upwardly through each successive reaction zone and into the entrainment removal unit 6 by way of risers 12. In this section the upflowing refrigerant vapors pass through the downflowing liquid isobutane by means of the trays 10 thus effectively refluxing back any entrained acid and alkylates to the reaction zone. The refrigerant vapors pass from the entrainment unit 6 through a demister 42 so as to remove any liquid present therein and thence outwardly of the system by means of line 43.

The refrigeration vapors removed from the alkylation tower 8 by means of line 43 contain substantial amounts of isobutane as well as any propane which was introduced into the system along with the olefin feedstock. Therefore, in accordance with the further teaching of the present invention, I have provided a method of carrying out the fractionation of the lower boiling constituents, e.g. propane, and the removal of the heat of vaporization from these refrigerant vapors before the isobutane is recycled back to the alkylation tower.

In proceeding in accordance with the present invention I provide for the fractionation of the refrigerant vapors by utilizing the heat available after compressing the vapors to provide the reboiling energy necessary for the fractionation, the fractionation itself being effected in the presence of a cold reflux stream of the lower boiling constituent, e.g. propane, which is obtained in the process as hereinafer described.

Figure 2:
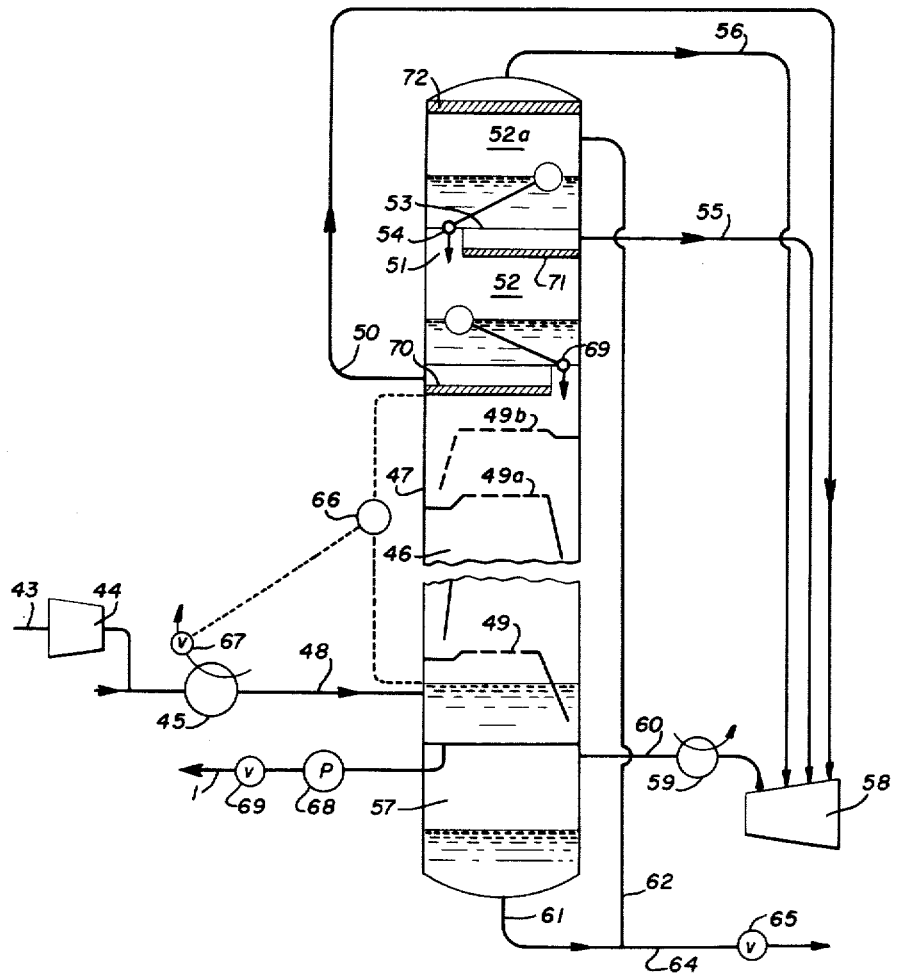
FIGURE 2 shows a cross-sectional modification of a fractionation tower useful in effecting the separation of the low boiling normal paraffins from the refrigerant stream before it is returned to the alkylation reactor.

Referring now to FIGURE 2, I have provided a compressor 44 in the refrigerant vapor drawoff line 43. Compressor 44 compresses the refrigerant vapors to a pressure whereat they can be partially condensed with the cooling medium available. The compressed refrigerant vapors are then introduced into a partial condenser 45 through which flows a cooling medium such as water. The flow of the coolant through partial condenser 45 is maintained at such a rate that only a part of the compressed refrigerant vapors will be condensed, namely, a portion of the isobutane. I have also provided means to automatically regulate the coolant flow through condenser 45 so as to provide the desired amount of compressed vapors to the fractionation tower 47 by a manner hereinafter explained. By providing this partial condenser in the compressed refrigerant vapor line, I effectively increase the concentration of the propane vapors in the compressed refrigerant stream entering the fractionation tower 47 by removing a liquid part of the isobutane from the vapor. The partially condensed refrigerant vapors are introduced in the enriching fractionation section 46 of fractionation tower 47 at the bottom thereof by means of line 48. Fractionation tower 47 is comprised of three sections, i.e. upper section 51, middle section 46 and lower section 57. The middle section 46 is the enriching fractionation section and has therein a plurality of vertically disposed horizontally positioned liquid-vapor contact plates 49, 49a, 49b, etc. These contact plates can be of the conventional bubble plate type if desired or they can be perforated plates. At the top of enriching fractionation section 46 is provided line 50 for the removal of the propane vapors separated in the enriching section. The upper section 51 of fractionation tower 47 constitutes a storage tank for the cold reflux stream of propane to be introduced into enriching section 46 by means of liquid valve 69. This upper section not only provides storage for the reflux steam but will also provide additional cooling of the propane since a certain amount of evaporation will take place therein. Section 51 can be divided into two or more compartments as shown at 52 and 52a if desired with the compartments being separated as by plate 53 having liquid valve 54 therein. In order to remove any propane evaporated in each of the separate compartments, I have provided lines 55 and 56 at the top of the respective compartments. The lower section 57 of tower 47 constitutes a receptacle in which the propane can be stored after compressing and condensing as hereinafter explained. In order to provide the cold reflux stream to the top of the enriching fractionation section 46, I make use of a compressor 58 and condenser 59 to liquefy and cool the propane vapors removed as overhead by means of lines 50, 55 and 56. If found necessary or desirable I can provide as shown at 70, 71 and 72 demisters in the propane removal outlets so as to remove any liquid which may be entrained in the vapors. The compressed condensed propane is sent to storage section 57 by means of line 60 from whence it can be withdrawn by line 61 located at the bottom of section 57, as needed. A part of the condensed propane collecting in section 57 is recycled to the top of the enriching fractionation section 46 by means of line 62. The remainder of the propane can be withdrawn from the system as by line 64 and valve 65 and disposed of as desired. It is also possible to provide the section 57 so that a vapor product is withdrawn rather than the liquid propane product. The operation of my propane removal unit can be described as follows.

The refrigerant vapors entering compressor 44 are compressed to a pressure of about 25 to 70 p.s.i.g. so that the isobutane will be partially condensed at a temperature of about 90 to 120° F. depending upon the approach and the temperature of the coolant medium flowing through condenser 45. The pressure of section 46 is maintained at about the same level as the refrigerant discharge pressure less the pressure drop in the intervening equipment. The compressed partially condensed refrigerant vapors entering enriching section 46 will contain heat of vaporization and as mentioned previously, I make use of this available heat to provide the reboiling energy necessary for the fractionation by operating the tower under the above-described conditions.

In order to regulate the vapor flow to section 46, I have provided a pressure differential instrument 66 across the enriching section and connected to a valve 67 in the coolant line to condenser 46. When the pressure in section 46 tends to rise above a set predetermined level, the pressure controller 66 operates valve 67 increasing the flow of coolant through condenser 45 which in turn decreases the flow of vapors to section 46. If the pressure in section 46 drops, the valve 67 is operated to decrease the flow of coolant through condenser 45 and thus to increase the flow of vapors to section 46. By operating in this manner a given predetermined amount of vapors always enters section 46. As the refrigerant vapors pass upward in section 46 they are washed by a cold reflux stream of liquid propane flowing downwardly over the trays 49. As the cold stream progresses downwardly through the enriching section it becomes progressively richer in isobutane and the vapors passing upwardly become richer in propane. The enriched propane vapors are taken off as overhead and sent to the compressor 58 and condenser 59 wherein they are compressed and cooled to serve as additional reflux. Likewise, any propane evaporated from chambers 52 and 52a are sent to the same compressor-condenser circuit for reuse as reflux. The propane vapors taken overhead are compressed to a pressure so that they can be condensed with the available cooling medium. Thus, as the temperature of the coolant flow through the condenser 59 is about 90 to 100° F., the compressor 58 must be operated at a pressure of about 150 to 200 p.s.i.g.

The tower pressure can be controlled by regulating the speed of the propane compressor 58. This compressor speed can be automatically adjusted to any temperature consistent with the temperature of the cooling medium passing through the condenser so that the amount of propane taken off overhead can be varied so as to adjust the tower pressure. The cooled liquid propane from the compressor and condenser is then sent to section 57. The liquid returning to the bottom of enriching section 46 is substantially pure isobutane and can be returned to the alkylation tower 8 (FIGURE 1) by means of pump 68 and valve 69 in line 1.

Obviously, many variations and changes can be made in the above apparatus to effect the present process for removing the propane from the refrigerant vapors. For instance, upper section 51 of tower 47 can be completely eliminated with the desired cold stream of propane reflux introduced directly into the top of the enriching section 46 with the ratio of reflux flow being regulated by a valve in line 62. Also the storage section 57 at the bottom of tower 47 can be eliminated if desired with the reflux being returned directly from the condenser 59.

Thus, it can be seen from the above description of the operation of my alkylation reaction system and propane removal system that I have provided an efficient means to continuously alkylate an isoparaffin with an olefin while in the presence of a sulfuric acid catalyst and have provided within the same system a means for substantially eliminating diluents such as propane from the alkylation reactant stream. It is to be understood, however, that the present invention is not intended to be limited to only the alkylation of isobutane with olefins using sulfuric acid as a catalyst nor to the removal of only propane from the refrigerant vapors but rather the system can be effectively utilized to effect any auto-refrigerated alkylation process and to remove any undesirable hydrocarbon components having a boiling point below that of the isoparaffin reactant.

It is claimed:

1. An auto-refrigerated alkylation system for alkylating isoparaffin with olefin in the presence of a liquid catalyst which comprises, a vertically disposed alkylation reaction tower, said tower having provided at the top thereof means to flash said isoparaffin into a vaporous portion and a liquid portion, means to withdraw said vaporous portion, said withdrawal means communicating with the bottom of said tower, means to contact said liquid portion with a refrigerant vapor stream, and means to remove said contacted refrigerant vapor stream, said tower having further provided at the bottom thereof a series of vertically positioned horizontally disposed liquid-vapor contact trays, means to emulsify said liquid isoparaffin and said catalyst, means to introduce said isoparaffin-catalyst emulsion onto the uppermost of said contact trays, means to introduce across the inlet of each of said trays said olefin, means to vary the pressure in said reaction tower so as to withdraw a vapor portion of the reaction mixture, said withdrawn vapor portion of the reaction mixture constituting the refrigerant vapor stream, means to compress, condense and return said refrigerant vapor stream to the top of said tower, means to remove the reaction product and catalyst from the bottom of said tower, means to effect the separation of said reaction product from said catalyst and means to contact said reaction product with incoming fresh catalyst.

2. An auto-refrigerated alkylation system for alkylating isoparaffin with olefin in the presence of a liquid catalyst which comprises a vertical reaction tower, said tower being divided into an upper entrainment removal unit and a lower alkylation reaction unit by a horizontal plate having vapor risers disposed therein, said entrainment removal unit being divided by a horizontal partition into an upper flash chamber and a lower liquid-vapor contact section, means provided at the top of said contacting section to remove a refrigerant vapor stream therefrom, means provided at the bottom of said contacting section to remove liquid isoparaffin therefrom, means provided in said flash chamber to remove vaporous isoparaffin as overhead, said overhead means communicating with the bottom of said alkylation reaction unit and means provided in said horizontal partition to permit liquid drainage, said liquid removal means provided at the bottom of said contacting section communicating with a means to mix the constituents therefrom with said liquid catalyst, means connecting said mixing means with the upper portion of said lower alkylation unit, said alkylation unit comprising a series of vertically disposed horizontally positioned liquid-vapor contact plates having downcomers, means to introduce said olefin across the inlet of said liquid-vapor contact plates, means to vary the pressure in said reaction tower so as to withdraw a vapor portion of the reaction mixture, said withdrawn vapor portion constituting the refrigerant stream, means to compress, condense and return said refrigerant vapor stream to said entrainment removal unit, means provided in the bottom of said reaction unit to remove the reduction product and catalyst, means to effect the separation of said product from said catalyst and means to contact said separated product with fresh incoming catalyst.

3. In a process for the alkylation of isoparaffin with olefin while in the presence of a liquid catalyst, the steps which comprise cooling said reactants and said catalyst, introducing said cooled isoparaffin into a flash zone, separating a vaporous portion as overhead and a cooled liquid portion as bottoms, introducing said vaporous portion to the bottom of an alkylation reactor, passing said liquid portion over a series of liquid-vapor contact plates, mixing said liquid isoparaffin with said catalyst and introducing said isoparaffin-catalyst mixture into the top of said alkylation reactor, passing said mixture downwardly over a series of liquid-vapor contact trays, introducing across the inlet of each of said contact trays said olefin, while continuously drawing off a vaporous part of the reaction mixture, passing said vaporous part upward through said liquid-vapor contact trays and plates, withdrawing said vaporous parts, compressing, and partially condensing said vaporous part, and returning said condensed vaporous part to said flash zone, and withdrawing the desired alkylate product and catalyst as a liquid bottoms fraction from said alkylation zone, separating said liquid catalyst therefrom, contacting said product with incoming fresh catalyst and passing said product to a fractionation tower.

4. A process as described in claim 3 wherein the isoparaffin is isobutane and the liquid catalyst is sulfuric acid having a concentration of about 86 to 100 weight percent.

5. In a process for the alkylation of isoparaffin with olefin while in the presence of a liquid catalyst, said olefin containing lower boiling hydrocarbons, the steps which comprise cooling said reactants and said catalyst, introducing said cooled isoparaffin into a flash zone, separating a vaporous isoparaffin portion as overhead and a cooled liquid isoparaffin portion as bottoms, introducing said vaporous portion to the bottom of an alkylation reactor, passing said liquid portion over a series of liquid-vapor contact plates, mixing said liquid isoparaffin with said catalyst and introducing said isoparaffin-catalyst mixture into the top of said alkylation reactor, passing said mixture downwardly over a series of liquid-vapor contact trays, introducing across the inlet of each of said trays said olefin, while continuously drawing off a vaporous part of the reaction mixture, said vaporous part consisting essentially of isoparaffin and said lower boiling hydrocarbon, passing said vaporous part upward through said trays and plates, compressing and partially condensing said vaporous part, introducing said compressed partially condensed vapors into a fractionation tower, said tower being under sufficiently low pressure which releases heat energy available in said compressed vapors, withdrawing as an overhead the vaporous lower boiling constituent, compressing and condensing said constituent and returning the condensed constituent to the top of said fractionation tower as reflux while continuously drawing off and returning as a bottom product liquid substantially pure isoparaffin to said flash zone and withdrawing the desired alkylate product and catalyst as a liquid bottoms fraction from said alkylation zone, separating said liquid catalyst therefrom, contacting said product with incoming fresh catalyst and passing said product to a fractionation tower.

6. A process as described in claim 5 wherein the isoparaffin is isobutane, the liquid catalyst is sulfuric acid having a concentration of about 86 to 100 weight percent and the olefin charge contains propane.

7. In a process of preparing a high octane alkylate product by the reaction of isobutane and olefin in the presence of a sulfuric acid catalyst in an auto-refrigerated alkylation zone, the improvement which consists in flashing the isobutane to provide a vaporous fraction and a cool liquid fraction, introducing the vaporous fraction into the bottom of the alkylation zone, passing the cool liquid fraction countercurrently to refrigerant vapors from said alkylation zone, emulsifying the cool liquid fraction with sulfuric acid and introducing the resulting emulsion into the top of the alkylation zone.

8. In a process of preparing a high octane alkylate product by the reaction of isoparaffin and olefin in the presence of a liquid catalyst in an autorefrigerated countercurrent liquid-vapor contact alkylation zone, the improvement which consists essentially in flashing the isoparaffin to provide a vaporous fraction and a cool liquid fraction, introducing the vaporous fraction into the lower portion of the alkylation zone, passing said liquid isoparaffin into countercurrent contact with refrigerant vapors from alkylation zone, and providing the contacted liquid fraction in admixture with said liquid catalyst the upper portion of the alkylation zone.

9. In a process of preparing a high octane alkylate product by the reaction of isoparaffin with olefin in the presence of a liquid catalyst in an autorefrigerated countercurrent liquid-vapor contact alkylation zone, the steps which comprise flashing the isoparaffin to provide a vaporous fraction and a cool liquid fraction, introducing the vaporous fraction into the lower portion of the alkylation zone, passing said liquid isoparaffin into countercurrent contact with refrigerant vapors from the alkylation zone, providing the contacted liquid fraction in admixture with said liquid catalyst in the upper portion of the alkylation zone, withdrawing a vaporous stream from the alkylation zone, said vaporous stream consisting essentially of isoparaffin and lower boiling hydrocarbons, compressing said stream, partially condensing said stream, introducing said compressed, partially condensed stream into a fractionation tower, said tower being under a pressure sufficiently low which releases the heat energy available in said compressed stream, withdrawing as an overhead the lower boiling vapor from said fractionation tower while drawing off liquid isoparaffin.

References Cited in the file of this patent
UNITED STATES PATENTS

| | | |
|---|---|---|
| 1,539,450 | Wilkinson | May 26, 1925 |
| 1,978,414 | Chillas | Oct. 30, 1934 |
| 2,335,704 | Smith | Nov. 30, 1943 |
| 2,378,439 | Schlesman | June 19, 1945 |
| 2,403,922 | Hawthorne | July 16, 1946 |
| 2,429,205 | Jenny et al. | Oct. 21, 1947 |
| 2,430,333 | Hadden | Nov. 4, 1947 |
| 2,664,452 | Putney | Dec. 29, 1953 |
| 2,828,348 | Stiles et al. | Mar. 25, 1958 |

FOREIGN PATENTS

| | | |
|---|---|---|
| 115,253 | Australia | June 11, 1942 |

UNITED STATES PATENT OFFICE
CERTIFICATE OF CORRECTION

Patent No. 3,088,987                                                May 7, 1963

Robert L. Irvine

It is hereby certified that error appears in the above numbered patent requiring correction and that the said Letters Patent should read as corrected below.

Column 1, lines 15 and 16, for "constituens" read -- constituents --; column 6, line 18, for "oredr" read -- order --; column 7, line 13, for "perviously" read -- previously --; column 8, line 59, for "46" read -- 45 --; column 10, line 31, for "reduction" read -- reaction --.

Signed and sealed this 14th day of January 1964.

(SEAL)
Attest:
ERNEST W. SWIDER

Attesting Officer

EDWIN L. REYNOLDS

Acting Commissioner of Patents